United States Patent Office 3,056,683
Patented Oct. 2, 1962

3,056,683
MANUFACTURE OF POTATO PRODUCTS
Joseph W. Cyr, Pittsfield, Maine, assignor, by mesne assignments, to H. C. Baxter & Bro., Brunswick, Maine, a firm
No Drawing. Filed Aug. 4, 1958, Ser. No. 753,088
6 Claims. (Cl. 99—207)

This invention relates to improvements in the manufacture of potato products of the type now sold on the market as "Instant Whipped" potatoes. Instant whipped potatoes are manufactured by a process developed by the Department of Agriculture and are covered by certain patents issued under the provisions of Title 35 U.S. Code (1952) Sec. 266. The prevailing practice for producing the so-called instant whipped potatoes consists of the following steps:

The potatoes are abrasive peeled, trimmed, sliced into ⅜ inch slices and rinsed to remove free starch. The potatoes are then pre-cooked in water at about 140°–180° F. for 10 to 60 minutes. The water is then drawn off and the potatoes are cooked in live steam at atmospheric pressure for about 16 minutes. They are then riced, at which time additives are incorporated as follows: a solution containing 2.5% sodium bisulfite and 7.5% sodium sulfite by weight at a rate such that the mash will contain 400 p.p.m. $SO_2$ which will result in 200 p.p.m. $SO_2$ in the finished product; and a solution containing 3.75% dry non-fat milk solids, 3.0 to 4.5% glycerol monopalmitate, 2.25% Tenox VI (an antioxidant consisting of butylated hydroxyanisole, butylated hydroxytoluene, citric acid, glycerides and propylene glycol) and 0.75 to 1.50% fat at a rate to give 0.075% Tenox VI in the product. Directly after ricing, the mash with additives is dehydrated to a moisture content of 2 to 7% on a single drum drier internally heated with steam. The dehydrated sheet is then cut or broken into square flakes about ½ inch across and packaged in moisture proof bags, one or more of which are packed for marketing in pasteboard boxes. The flakes thus produced are approximately monocellular in thickness and contain very few ruptured cells and little free starch.

When the flakes are used according to directions, the resulting product compares favorably with mashed potatoes made according to the recipes followed in the better class hotels and restaurants.

In accordance with invention of this application the texture and appearance of the resulting product is improved if the above described process is modified as hereinafter described.

In carrying out my improvement I proceed as above described and spray onto the monocellular sheet of the cooked potato mash just after the mash is applied to the drum, a melted emulsifier in an amount in the order of 1–3% of the dried product. The emulsifiers which I have found particularly satisfactory for this purpose are polyoxyethylene sorbitan mono-stearate, polyoxyethylene sorbitan mono-oleate, polyoxyethylene stearate and sorbitan monostearate. The emulsifier is sprayed on the back of the sheet after it is applied to the heated drum because it has been found that if the emulsifier is incorporated in the potato mash it will act as a parting agent and cause the sheet of mash potatoes to fold away from the drum before it is dried and flaked. Instead of spraying the heated emulsifier against the back of the sheet it may be wiped on by a felt covered roll or belt or applied by a wick from a suitable heated reservoir.

The process may be somewhat modified by mixing with the emulsifier a fat or oil such as commercial shortenings prepared from cottonseed and other vegetable oils. When such shortenings are mixed with the emulsifier in the order of 60% shortening and 40% emulsifier a smaller quantity of the emulsifier is required for the same amount of the product than when the emulsifier is used alone.

The above described process may also be advantageously modified by dusting Methocel (methylcellulose) on the dried sheet to which the emulsifier or the mixture of emulsifier and shortening has been added just before the sheet is removed from the drum or on the flakes made from the sheet. The added Methocel should be about the same in quantity as the added emulsifier or the added mixture of shortening and emulsifier. Other emulsion stabilizers such as pectin, and Irish sea moss may be used instead of Methocel.

I claim:

1. In a method of making dried mashed potatoes wherein an emulsifier is added to cooked mashed potatoes and the cooked mashed potatoes are dried in thin sheets on a heated surface; the improvement in which the emulsifier is applied to the exposed surface of the sheet while drying.

2. The process of claim 1 wherein the emulsifier is taken from the class consisting of polyoxyethylene sorbitan mono-stearate, polyoxyethylene sorbitan mono-oleate, polyoxyethylene stearate and sorbitan mono-stearate.

3. The process of claim 1 wherein the emulsifier is mixed with a shortening agent.

4. The process of claim 2 wherein the emulsifier is mixed with a shortening agent.

5. The process of claim 1 wherein an emulsion stabilizer is applied to the surfaces of the dried product after the application of the emulsifier.

6. The process of claim 5 wherein the stabilizer is methylcellulose.

References Cited in the file of this patent

"Potato Flakes, a New Form of Dehydrated Mashed Potatoes—I, Pilot Plant Process Using Double Drum Drier," United States Dept. of Agr., Agricultural Research Service, ARS–73–2, November 15, 1954, 6 pp. text, 4 pp. (not numbered) figures, pp. 1 to 5 of text relied on.